United States Patent
Jongsma et al.

(10) Patent No.: US 8,234,918 B2
(45) Date of Patent: Aug. 7, 2012

(54) ACTIVE AND ADAPTIVE TIRE SYSTEMS

(75) Inventors: Jakob Jongsma, Graz (AT); Horst Theuss, Wenzenbach (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 12/849,430

(22) Filed: Aug. 3, 2010

(65) Prior Publication Data
US 2010/0300191 A1 Dec. 2, 2010

Related U.S. Application Data

(62) Division of application No. 12/049,416, filed on Mar. 17, 2008, now Pat. No. 7,814,781.

(51) Int. Cl.
*G01M 17/02* (2006.01)
*B60C 19/00* (2006.01)
(52) U.S. Cl. ...................................... 73/146; 152/152.1
(58) Field of Classification Search .......... 73/146–146.8
See application file for complete search history.

(56) References Cited

U.S. PATENT DOCUMENTS

| 7,343,787 | B2 | 3/2008 | Oflaz | |
|---|---|---|---|---|
| 2004/0140042 | A1* | 7/2004 | Teratani et al. | 156/110.1 |
| 2005/0257609 | A1 | 11/2005 | Mancosu | |
| 2006/0243043 | A1* | 11/2006 | Breed | 73/146 |
| 2006/0244581 | A1 | 11/2006 | Breed | |
| 2006/0257609 | A1 | 11/2006 | Winter | |
| 2006/0260390 | A1 | 11/2006 | Oflaz | |
| 2007/0074564 | A1 | 4/2007 | Rennich | |
| 2008/0289407 | A1* | 11/2008 | Gramling et al. | 73/146.5 |
| 2009/0314404 | A1* | 12/2009 | Rodgers et al. | 152/209.5 |
| 2009/0314406 | A1* | 12/2009 | Browne et al. | 152/503 |
| 2009/0315696 | A1* | 12/2009 | Browne et al. | 340/442 |
| 2010/0077848 | A1* | 4/2010 | Ulicny et al. | 73/146 |
| 2011/0011172 | A1* | 1/2011 | Schreiner et al. | 73/146.3 |
| 2011/0024010 | A1* | 2/2011 | Browne et al. | 152/209.5 |

* cited by examiner

*Primary Examiner* — Andre Allen
(74) *Attorney, Agent, or Firm* — Patterson Thuente Christensen Pedersen, P.A.

(57) ABSTRACT

An active and adaptive tire system is disclosed. The active and adaptive tire system comprises a tire and an active material configured to alter at least one characteristic of the tire in response to at least one condition. Also disclosed are an intelligent tire system and a method of monitoring a condition.

14 Claims, 5 Drawing Sheets

ACTIVE AND ADAPTIVE TIRE SYSTEMS

RELATED APPLICATION

This application is a division of application Ser. No. 12/049,416 filed Mar. 17, 2008, which is hereby fully incorporated herein by reference.

FIELD OF THE INVENTION

The invention generally relates to intelligent tire systems. More particularly, the invention relates to active tire systems capable of sensing conditions and characteristics and dynamically adapting thereto.

BACKGROUND OF THE INVENTION

Tire pressure monitoring systems (TPMS) are used to monitor conditions within and surrounding vehicle tires. Parameters typically monitored include local temperature and pressure information. Many TPMS comprise tire-based sensors and other components that monitor and then transmit the local information via radio signals to a central receiver in another part of the vehicle. Power is supplied to the tire-based systems by local batteries, energy harvesters or scavengers, or other means.

Traditional TPMS are passive: the systems monitor one or more vehicle tires and optionally the ambient environment but do not interact with or provide feedback to the tires to actively adjust or compensate for sensed conditions. A driver may therefore be automatically notified of a condition, but any necessary or desired adjustment must be manually accomplished. For example, if snow or ice or hazardous driving conditions are detected, a driver may alter his or her driving behavior, such as by slowing down and judiciously applying the brakes, or by changing to winter or snow tires at the next opportunity. Problems may still result, however, if a driver makes insufficient or incorrect driving behavior alterations. Further, frequent changing of tires to conform to various driving and road conditions is impractical and expensive.

SUMMARY OF THE INVENTION

One embodiment of the invention is an active and adaptive tire system. The active and adaptive tire system comprises a tire and an active material configured to alter at least one characteristic of the tire in response to at least one condition.

Another embodiment of the invention is an intelligent tire system. The intelligent tire system comprises at least one tire comprising a material having a response to a trigger, a wheel module proximate the tire and comprising a sensor configured to sense a condition and circuitry configured to selectively trigger the material based on the condition, and a control 10 unit communicatively coupled to the wheel module.

In a further embodiment, the invention is a method of monitoring a condition. A tire is formed including an active material having a response to a condition. A condition is sensed, triggering the response, and at least one characteristic of the tire is altered by the response.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood from the following detailed description of various embodiments in connection with the accompanying drawings, in which.

Figure 1:
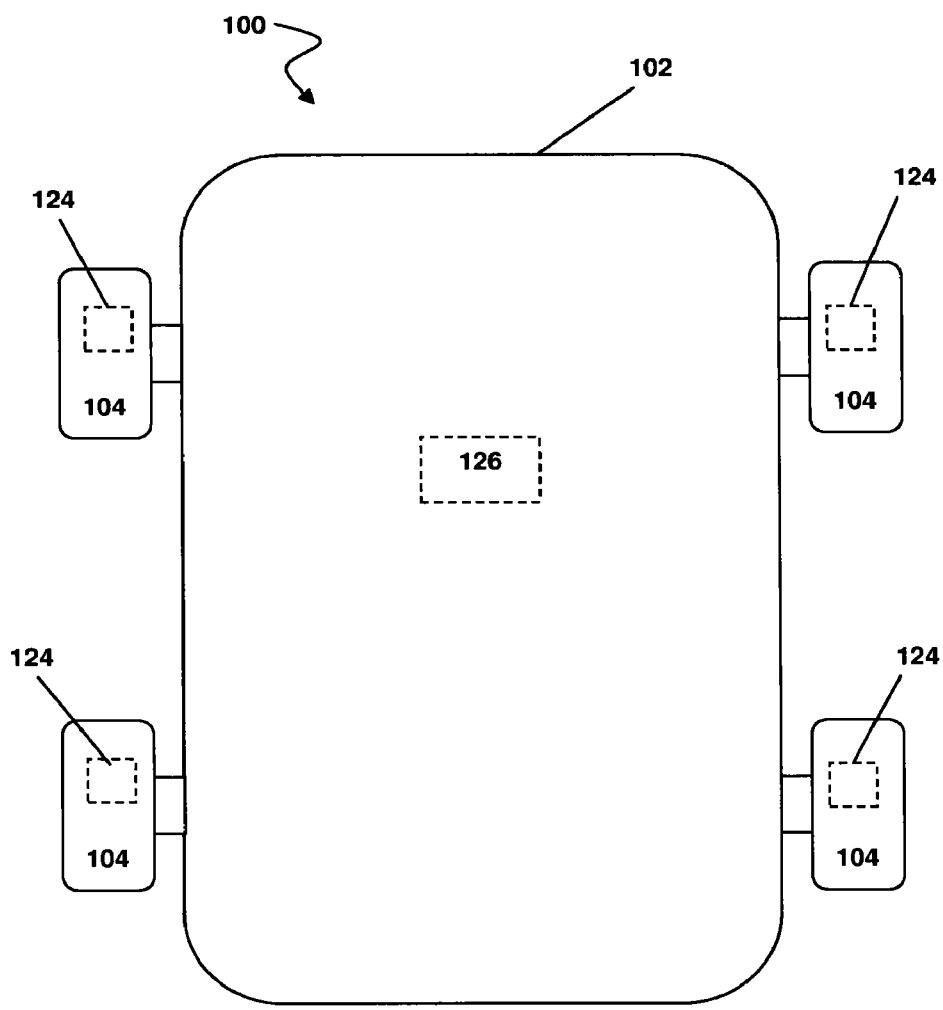
FIG. 1 is a block diagram of a vehicle in accordance with an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The invention is related to next-generation intelligent tire systems, such as active and adaptive tire systems and methods. Various embodiments of the invention can sense actual tire, road and driving conditions and characteristics, and/or respond to externally controlled influences, and dynamically adapt thereto, thereby improving vehicle and passenger safety. The invention can be more readily understood by reference to FIGS. 1-6 and the following description. While the invention is not necessarily limited to the specifically depicted application(s), the invention will be better appreciated using a discussion of exemplary embodiments in specific contexts.

Referring to FIG. 1, an intelligent tire system (ITS) 100 according to an embodiment of the invention is depicted. ITS 100 is implemented in a vehicle 102, which can comprise an automobile, SUV, truck, semi-truck, bus, motorcycle, or other vehicle having two, four, or some other number of wheels and tires. As depicted and described in the example that follows, vehicle 102 has four wheels 104 and is but one example of a suitable vehicle for implementing various embodiments of ITS 100.

Figure 2:
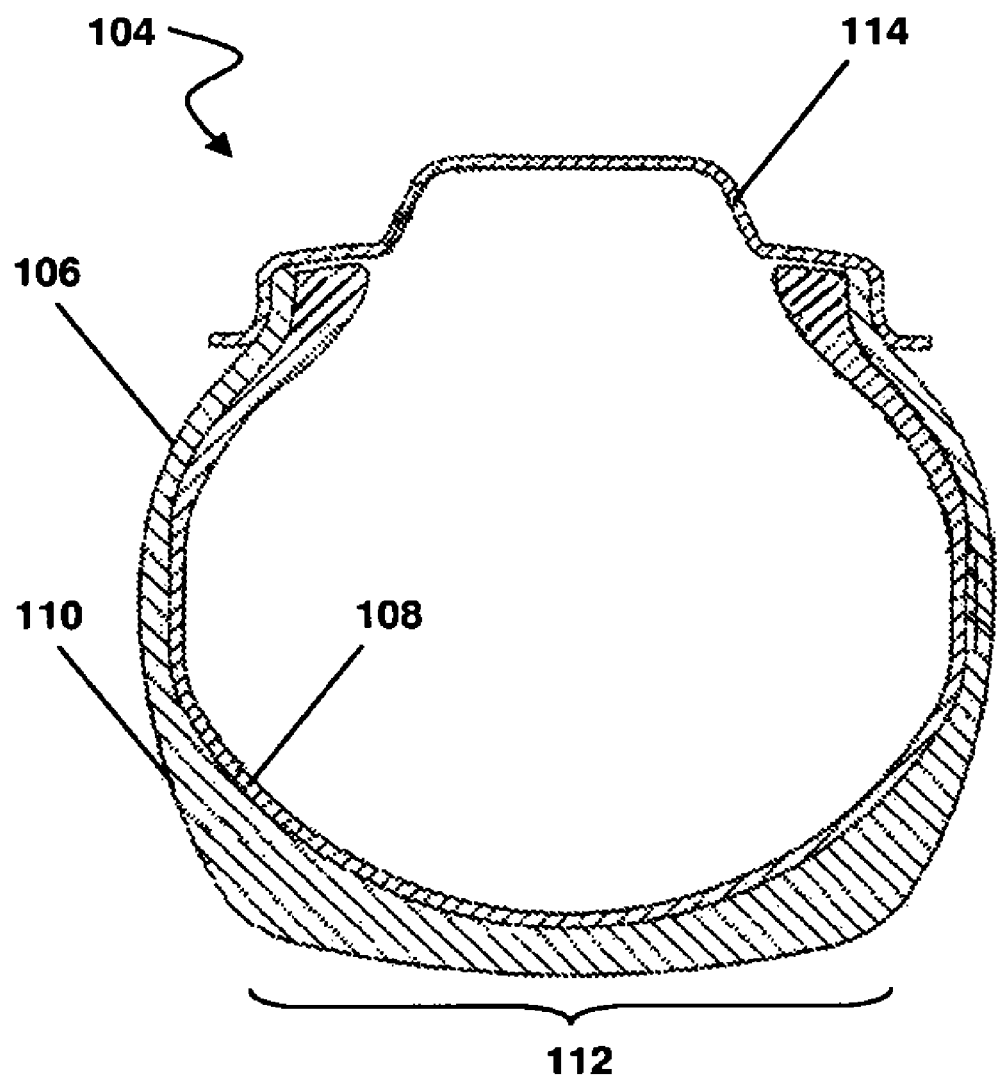
FIG. 2 is a cross-sectional view of a wheel in accordance with an embodiment of the invention.

Referring to FIG. 2, each wheel 104 typically comprises a tire 106 including an inner liner 108 that lines the inside of tire 106, multiple ply layers (not shown) over the inner liner, and one or more steel belts over the ply layers (not shown). A cushion layer and a base layer (not shown) are situated over the steel belts and a cap layer 110, also referred to as the tread layer, is situated on the outside of tire 106 over the base layer. A tread portion 112 interacts 10 with the road surface to provide traction. The entire tire structure 106 is then mounted on a rim 114, forming wheel 104, and coupled to an axle of vehicle 102.

In various embodiments of the invention, one or more tires of vehicle 102 further comprise additional material layers or portions of embedded material that are active and can adapt to changing driving surface, tire, wheel, vehicle and/or other external conditions. This 15 adaptation can comprise, in one embodiment, a change in one or more mechanical properties of the tire, such as surface hardness, flexibility, rigidity, roughness or profile. In further embodiments, adaptations can comprise increasing or decreasing tire pressure and/or altering friction effects related to driving surface or speed by raising or lowering a tire temperature. These and other adaptations can be electrically and/or mechanically induced or can be 20 effected by an external electric or magnetic field or other force in various embodiments.

Figure 3A:
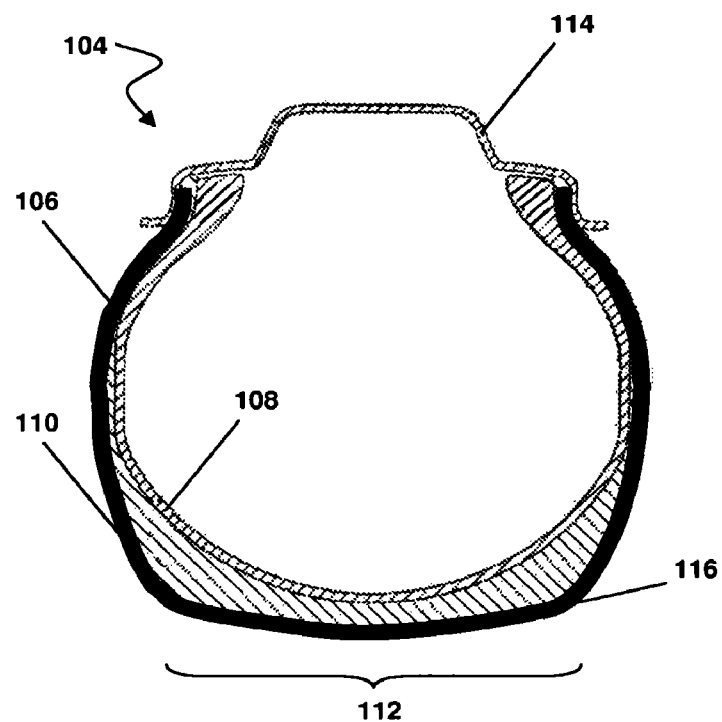
FIG. 3A is a cross-sectional view of a wheel in accordance with an embodiment of the invention.

In FIG. 3A, tire 106 further comprises an active portion. In one embodiment, the active portion comprises an active material layer 116 applied on or over at least a portion of cap layer 110. For example, active portion 116 can be laminated or adhered to cap layer 110. In another embodiment, active material layer 116 is integrally formed with at least a portion of an outer surface of cap layer 110. In a further embodiment, active material layer is embedded within tire 106, for example in or to cap layer 110, between cap layer 110 and inner liner 108, between cap layer 110 and a thin protective outer layer, and or among other layers of tire 106, such as those described above. In yet another embodiment, active material layer 116 comprises a plurality of individual layers arranged adjacent to or apart from one another on or within tire 106. As depicted in FIG. 3A, active material layer 116 corresponds 5 to substantially the entire external surface of tire 106. In other embodiments, active material layer 116 is limited to some or all of tread portion 112, to tread portion 112 as well as at least a portion of the sidewall of tire 106, or to some other configuration.

Figure 4A:
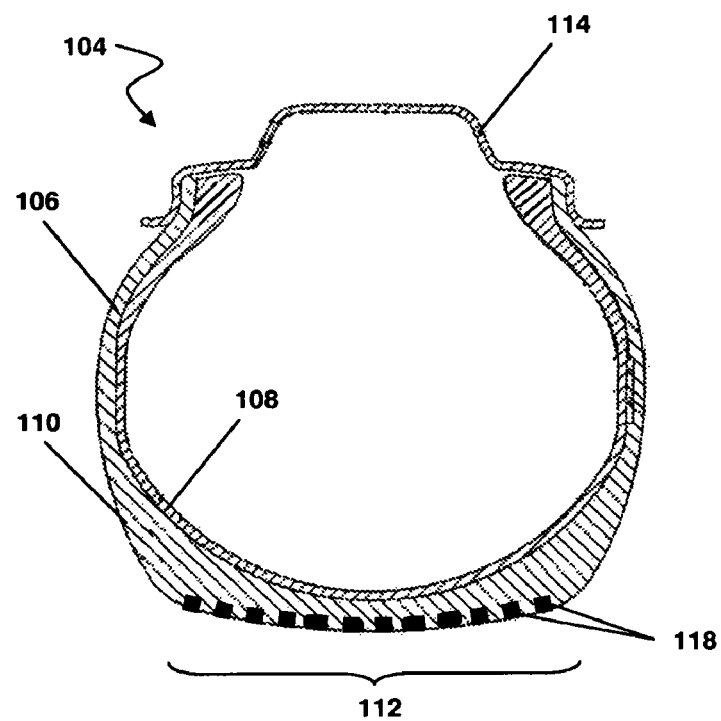
FIG. 4A is a cross-sectional view of a wheel in accordance with an embodiment of the invention.
Figure 4B:
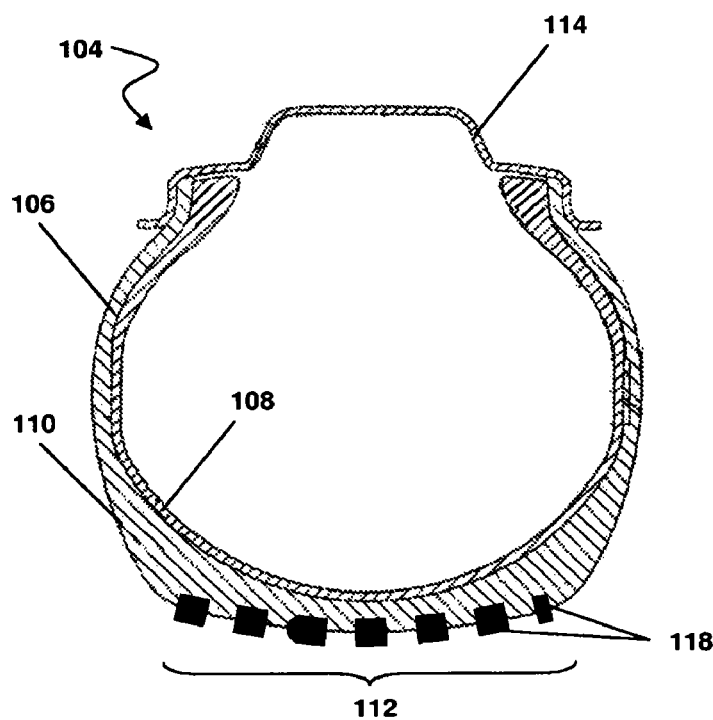
FIG. 4B is another cross-sectional view of the wheel of FIG. 4A.

In the embodiment of FIG. 4A, the active portion comprises at least one active material element 118. Active material elements 118 can comprise strips, beads, sections, or 10 other configurations and can be applied to or embedded partially or wholly within cap layer 110 in tread area 112. In one embodiment, active material elements 118 form at least part of the tread of tire 106. In another embodiment, one or more active material elements are also located in a sidewall or other portion of tire 106. In embodiments comprising a plurality of active material elements 118, whether arranged in tread area 112 or a sidewall portion or both, 15 adjacent elements 118 can be spaced in a regular or irregular manner.

Figure 5:
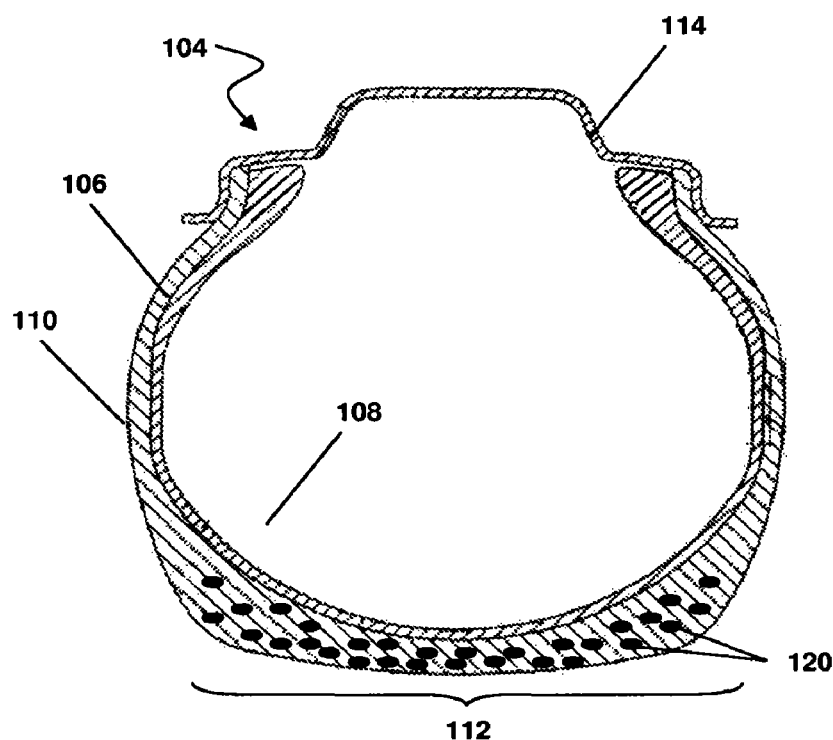
FIG. 5 is a cross-sectional view of a wheel in accordance with an embodiment of the invention.
Figure 6:
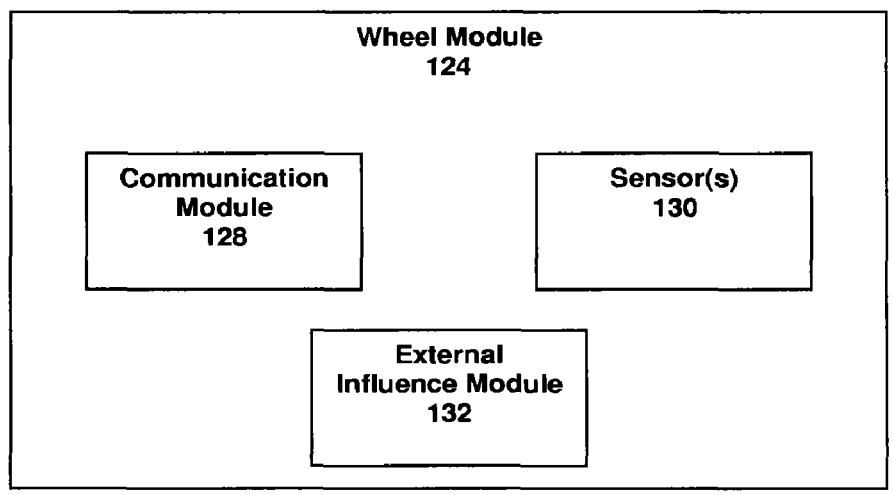
FIG. 6 is a block diagram of a wheel module in accordance with an embodiment of the invention.

In FIG. 5, tire 106 includes an active portion comprising embedded particles 120. In one embodiment, particles 120 are embedded in tread area 112 of cap layer 110. In other embodiments, particles 120 are embedded in additional or other layers of tire 106, in additional or other areas of tire 106, or in further beneficial configurations. In one embodiment, embedded particles 120 are integrally formed with the material(s) of tire 106 during manufacture. In other embodiments, particles 120 are embedded via injection or some other suitable process.

Various combinations of the embodiments depicted in FIGS. 3A, 4A and 5 and described above can be used in other embodiments of the invention. For example, particles 120 can be embedded within cap layer 110 and active material elements 118 applied to an external surface of cap layer 110. Other combinations of active material layer 116, active material elements 118, particles 120 and additional active material configurations can also be used.

The active portion or portions of tire 106, such as active material layer 116, active material elements 118, and particles 120, can comprise one or more variable materials. For example, an active piezoelectric material is used in one embodiment. The piezoelectric material can comprise a layer, film, foil, particle, strand, strip, or other configuration or combination thereof in various embodiments of the invention. Piezoelectric materials respond to triggers, such as external electric fields, a change in a charge state of internal electric dipoles, a change in temperature, and or a change in a variable resistance electric load, by 10 altering a characteristic or property, such as length. A change in a characteristic or property of the piezoelectric material can also effect a change in tire 106 in which the material is embedded, applied, or otherwise located. The piezoelectric material can be applied to, formed on or with, or otherwise supported by a base portion or layer, such as polypropylene, thermoplastic fluorpropylene, fluorinated ethylene, propylen-copolymere, polyvinylidene, and other suitable materials, although in some embodiments a base layer is omitted.

In other embodiments, the active portion or portions of tire 106 comprise a magnetostrictive material or a combination of piezoelectric and magnetostrictive materials. Various properties of magnetostrictive materials can be manipulated or influenced by external magnetic fields, temperature changes, andor variable resistance electrical loads. For example, an external magnetic field can induce a change in dimension of a magnetostrictive layer or portion in tire 106, thereby altering one or more properties, characteristics, or behaviors of tire 106. Base materials in embodiments comprising magnetostrictive materials can include, for example, flexible magnetic alloys such as FeSiB, FeCo, FeSi or FeSiB. Such materials can be manipulated by external magnetic fields to alter one or more dimensions or characteristics of tire 106, thereby providing a beneficial driving and or vehicle handling effect.

Permanent magnetic materials can also be used in other embodiments. Examples of suitable materials include or can comprise FeNdB, CoSm, AlNiCo, and FeTb, among others. The anisotropy of such permanent magnetic materials can be exploited by the proper orientation of magnetic fields.

In further embodiments, such as those depicted in FIGS. 4A-5, the active portion or portions of tire 106 can comprise foam, microplasma, and/or similar materials having electric dipoles that are variable or capable of being manipulated to provide a beneficial effect. These materials can be embedded within, injected into, or othenvise formed with one or more layers or portions of tire 106 to form composite material layers or portions. For example, foam or microplasma materials can be injected into cap layer 110 in one embodiment.

Additional materials can also be suitable in other embodiments. For example, polymers or other materials having a susceptibility to moisture, humidity, or a similar condition can be used. In one embodiment, a material having moisture diffusion permeability alters one or more characteristics, such as by swelling or expanding, in response to a change in humidity.

Simple metallic and/or magnetic particles, such as in the embodiments of FIGS. 4A and 5, can also be used. Such particles could be influenced by external changes in temperature. In one embodiment, these changes in temperature can be effected by irradiation of an alternating electromagnetic field. This irradiation can lead to heat dissipation by changes in magnetization and eddy current losses. By localizing the particles, for example as depicted in FIG. 4A and/or in inner layers of tire 106, changes can be effected in only certain desired areas of tire 106.

In accordance with the various embodiments described above, increased driving safety and security through better adherence of tire 106 on the road surface can be provided when a change in a characteristic of tire 106 is effected by the aforementioned active portion or portions of tire 106, such as active material layer 116, active material elements 118, and particles 120. In particular, the active portions can provide a real-time adjustment to currently prevailing driving, road, and/or tire conditions. In one embodiment, a profile or surface characteristic of tire 106 can be altered to better respond to, for example, icy, snowy, or rainy driving conditions. In another embodiment, a different physical characteristic, such as a hardness of one or more material layers of tire 106, is altered to provide better friction or adherence to a particular driving surface.

Figure 3B:
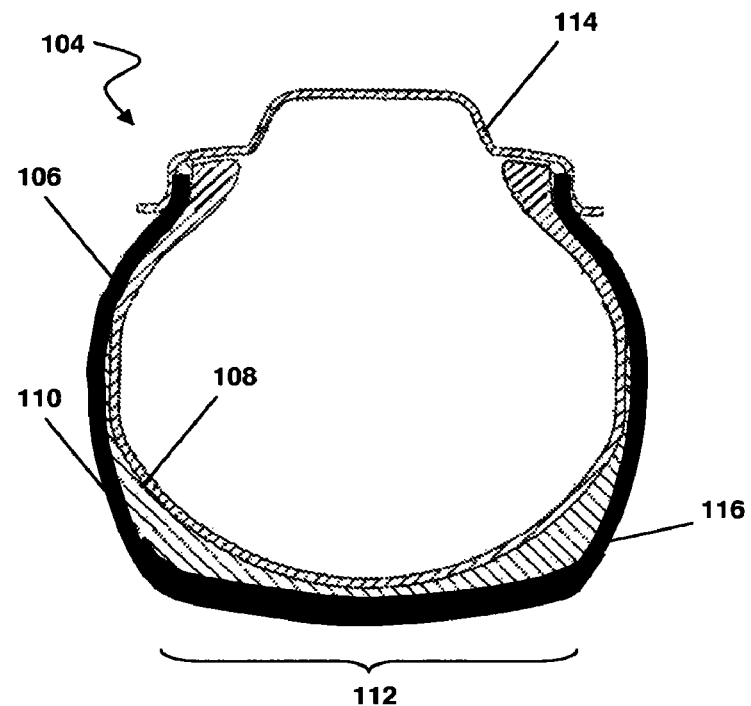
FIG. 3B is another cross-sectional view of the wheel of FIG. 3A.

Comparing FIGS. 3A and 3B, a change in active material layer 116 and cap layer 110 can be seen. Such a change can, for example, increase or decrease a tread depth, increase or decrease the contact area (or "footprint") of tire 106 in tread area 112, or make some other or additional change to provide a benefit to vehicle handling and safety. Similarly, in FIGS. 4A and 4B, a change in active material elements 118 can provide increased or decreased adherence of tire 106 to a driving surface in response to, for example, icy driving conditions or a gravel road surface.

These alterations can be automatic, such as in the case of active portions responsive to moisture, humidity, and other conditions, or externally influenced, such as in the case of magnetostrictive materials responsive to external magnetic fields. For either automatic or externally influenced changes, but particularly in the embodiments of the latter, each wheel 104 can comprise a wheel module 124 of a measurement and monitoring system (referring again to FIG. 1 in addition to FIG. 6). In other embodiments, fewer than all wheels 104 comprise wheel modules 124.

Each wheel module 124 is in communication with a central control unit 126 via a communication module 128 located in each wheel module 124 and central control unit 126. Communication module 128 can comprise wired and/or wireless circuitry in various embodiments. In the embodiment depicted, central control unit 126 is mounted in vehicle 102. In other embodiments, central control unit 126 can be external to vehicle 102. Central control unit 126 can be operable to monitor and control changes in each individual tire 106 such that overall driving safety and stability are not compromised because of sudden or disparate changes in one or more tires 106. For example, if vehicle 102 suddenly swerves and the two right-side wheels 104 leave a paved driving surface and encounter a gravel shoulder, a sudden adjustment by any of the tires 106 to compensate for the different driving surfaces could further endanger stability of vehicle 102 and hamper a driver's ability to regain control. In such situations, central control unit 126 can temporarily inhibit automatic or effected changes in all wheels 104 of vehicle 102. In other embodiments, central control unit 126 can calculate changes to one or more tires 106 that would assist a driver in regaining control. In further embodiments, central control unit 126 is also in communication with other vehicle safety systems, such as airbag, antilock braking, tire pressure, and the like, and can coordinate all systems to maximize vehicle and occupant safety.

Each wheel module 124 comprises at least one sensor 130 adapted to monitor the environment and conditions of and around wheels 104 in one embodiment. Sensor 130 can comprise capacitive, pressure, temperature, moisture, magnetic, gas, photo, acoustic and/or other sensors in various embodiments. In another embodiment, wheel module 124 comprises a sensor or sensor network coupled to or embedded within tire 106 of wheel 104.

In embodiments comprising materials influenced or controlled by external forces, wheel module 124 comprises an external influence module 132. In embodiments comprising, for example, magnetostrictive material, external influence module 132 can comprise one or 20 more magnets to produce a magnetic field. In other embodiments, external influence module 132 can comprise one or more devices operable to alter a temperature in or around tire 106, as many of the aforementioned active materials can be influenced by changes in temperature. For example, external influence module 132 can comprise infrared emitters, microwave irradiators, and/or other external heat sources. In other embodiments, the one or more 25 magnets are physically separate from but communicatively coupled to wheel module 124 in order to effect field changes to influence the active portion or portions of tire 106.

Wheel module 124 can further comprise one or more individual units distributed within or about each wheel 104. For example, wheel module 124 can comprise a first unit mounted in wheel 104, such as on the rim or to the inner liner, and a second unit mounted in a wheel well proximate wheel 104 in one embodiment. In another example, each component of wheel module 124 (communication module 128, sensor(s) 130 and magnet(s) 132) can be mounted separately in or around wheel 104. In various other embodiments, wheel module 124 comprises additional circuitry and components, such as circuitry to communication with the active portion or portions of tire 106.

In use, the various embodiments of the invention depicted and described herein can 10 improve vehicle and passenger safety by sensing and adapting to actual tire, road and driving conditions and characteristics. Further embodiments can respond to controlled influences, such as magnetic fields and heat sources, and dynamically adapt thereto, thereby improving vehicle and passenger safety.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. An active and adaptive tire system comprising:
a tire; and
an active material configured to alter at least one characteristic of the tire in response to at least one condition.

2. The system of claim 1, wherein the active material is embedded within the tire.

3. The system of claim 2, wherein the active material comprises a plurality of particles.

4. The system of claim 2, wherein the active material comprises a layer.

5. The system of claim 1, wherein the active material comprises a layer applied to an external surface of the tire.

6. The system of claim 1, wherein the active material is configured to automatically alter the at least one characteristic of the tire.

7. The system of claim 1, further comprising a sensor, wherein the sensor is configured to sense the at least one condition and the active material is configured to alter the at least one characteristic of the tire in response to the at least one condition sensed by the sensor.

8. The system of claim 1, wherein the active material is selected from the group consisting of:
a piezoelectric material, a magnetostrictive material, a combination of a piezoelectric material and a magnetostrictive material, a permanent magnetic material, a foam, a microplasma, and a polymer.

9. The system of claim 1, wherein the at least one characteristic of the tire is selected from the group consisting of: a dimension, a tread depth, a tread width, a footprint size, and a hardness.

10. The system of claim 1, wherein the at least one condition is selected from the group
consisting of:
a magnetic field, an electric field, an electromagnetic field, a driving surface condition, a moisture level, and a temperature.

11. A method of monitoring a condition comprising:
forming a tire including an active material having a response to a condition;
sensing the condition and triggering the response; and
altering at least one characteristic of the tire by the response.

12. The method of claim 11, further comprising mounting the tire on a vehicle.

13. The method of claim 11, wherein forming a tire further comprises forming a layer of the active material in the tire.

14. The method of claim 11, wherein forming a tire further comprises injecting the active material into at least a portion of the tire.

* * * * *